(12) United States Patent
Chen et al.

(10) Patent No.: US 11,618,114 B2
(45) Date of Patent: Apr. 4, 2023

(54) SPINDLE DEVICE

(71) Applicant: ANDERSON INDUSTRIAL CORP., Taipei (TW)

(72) Inventors: Yao-Hui Chen, Taipei (TW); Yu-Shih Chen, Taipei (TW); Ming-Che Lee, Taipei (TW)

(73) Assignee: ANDERSON INDUSTRIAL CORP., Taipei (TW)

( * ) Notice: Subject to any disclaimer, the term of this patent is extended or adjusted under 35 U.S.C. 154(b) by 616 days.

(21) Appl. No.: 16/849,295

(22) Filed: Apr. 15, 2020

(65) Prior Publication Data

US 2021/0213576 A1 Jul. 15, 2021

(30) Foreign Application Priority Data

Jan. 10, 2020 (TW) ................................ 109200397

(51) Int. Cl.
| | | |
|---|---|---|
| *B23Q 1/70* | (2006.01) | |
| *H02J 50/10* | (2016.01) | |
| *B23Q 3/12* | (2006.01) | |
| *B23Q 1/00* | (2006.01) | |
| B23B 37/00 | (2006.01) | |

(52) U.S. Cl.
CPC ............ *B23Q 1/0009* (2013.01); *B23Q 1/70* (2013.01); *B23Q 3/12* (2013.01); *H02J 50/10* (2016.02); *B23B 37/00* (2013.01); *B23Q 2230/002* (2013.01); *Y10S 82/904* (2013.01); *Y10T 409/309352* (2015.01)

(58) Field of Classification Search
CPC ....... H02J 50/10; B23Q 1/009; B23Q 1/0027; B23Q 1/70; B23Q 3/12; B23Q 5/10; B23Q 2230/02; B23B 29/00; B06B 1/02; Y10T 409/309352; Y10T 409/309408; Y10T 409/309464; Y10S 82/904
USPC ........ 451/162, 163, 164, 165; 409/231, 232, 409/233; 408/238, 239 A, 239 R, 240; 340/870.31; 324/149; 82/904
See application file for complete search history.

(56) References Cited

U.S. PATENT DOCUMENTS

| | | | | |
|---|---|---|---|---|
| 2009/0080990 A1* | 3/2009 | McMurtry | ........... | B23Q 1/0009 408/226 |
| 2015/0352713 A1* | 12/2015 | Takazakura | ............. | B23B 37/00 173/2 |
| 2018/0250758 A1* | 9/2018 | Jiang | .................... | B23Q 1/0027 |

FOREIGN PATENT DOCUMENTS

| | | | | | |
|---|---|---|---|---|---|
| CN | 204075721 U | * | 1/2015 | | |
| CN | 105171131 A | * | 12/2015 | | |
| CN | 106217437 B | * | 12/2017 | ............... | B06B 1/06 |

(Continued)

*Primary Examiner* — Boyer D Ashley
*Assistant Examiner* — Michael Vitale
(74) *Attorney, Agent, or Firm* — Hamre, Schumann, Mueller & Larson, P.C.

(57) ABSTRACT

A spindle device is mountable with a tool holder, and includes a rotating spindle rotatably mounted to a spindle main body and extending axially to have an axial end surface. A contactless power transmission module is disposed on a flange end surface of the spindle main body and an outer peripheral wall of the rotating spindle for supplying power. An electrically connecting module includes two conductive units each disposed in the rotating spindle and electrically connected with the power transmission module. Each conductive unit has an electrically conductive post extending axially and exposed from the axial end surface for conducting the power to the tool holder.

14 Claims, 6 Drawing Sheets

(56) References Cited

FOREIGN PATENT DOCUMENTS

| CN | 110394464 A | * | 11/2019 | ............... B06B 1/06 |
| CN | 110524015 A | * | 12/2019 | |
| DE | 3813949 A | * | 11/1989 | ........... B23Q 1/0009 |

* cited by examiner

SPINDLE DEVICE

CROSS-REFERENCE TO RELATED APPLICATION

This application claims priority of Taiwanese Patent Application No. 109200397, filed on Jan. 10, 2020.

FIELD

The disclosure relates to a spindle device for a machine tool, and more particularly to a spindle device with a power transmission module.

BACKGROUND

In the field of precision machining, an ultrasonic machine is commonly used for cutting or boring a workpiece with a highly hard brittle material. The ultrasonic machine generally includes a rotating spindle and an ultrasonic tool holder mounted thereon. The ultrasonic tool holder includes a holder body and a power transmission module disposed at a lateral side of the holder body. The bulky power transmission module is liable to contact and impact a workpiece and a worktable of a machine base during the rotation of the spindle in a cutting working process.

SUMMARY

Therefore, an object of the disclosure is to provide a spindle device that can alleviate at least one of the drawbacks of the prior art.

According to the disclosure, the spindle device is mountable with a tool holder which has two electrically conductive modules, and includes a spindle main body, a rotating spindle, a contactless power transmission module and an electrically connecting module. The spindle main body extends in an axial direction to terminate at a surrounding flange which extends radially and outwardly relative to an axial line. The surrounding flange has a flange end surface. The rotating spindle is rotatably mounted to the spindle main body about the axial line, and has a connecting portion which projects outwardly of the flange end surface to be connectable with the tool holder. The connecting portion has an outer peripheral wall which surrounds the axial line and which extends in the axial direction to terminate at an axial end surface. The contactless power transmission module is disposed on the flange end surface and the outer peripheral wall for supplying power. The electrically connecting module includes two conductive units which are disposed in the connecting portion of the rotating spindle and which are electrically connected with the contactless power transmission module. Each of the conductive units includes an insulating support socket and an electrically conductive post which is inserted in the insulating support socket and which extends in the axial direction to have a terminal contact portion that is exposed from the axial end surface for conducting the power to a corresponding one of the electrically conductive modules of the tool holder.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
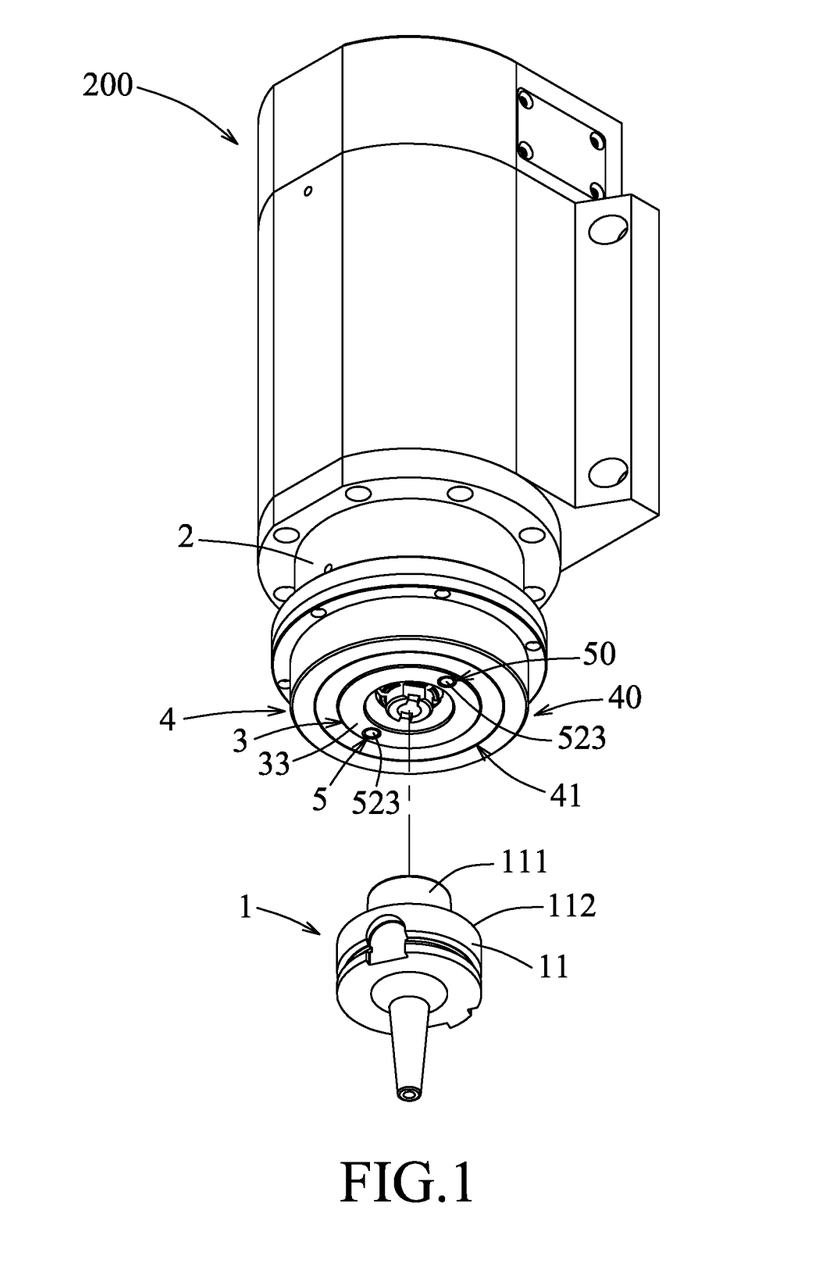
FIG. 1 is an exploded perspective view illustrating an embodiment of a spindle device according to the disclosure and a tool holder.
Figure 2:
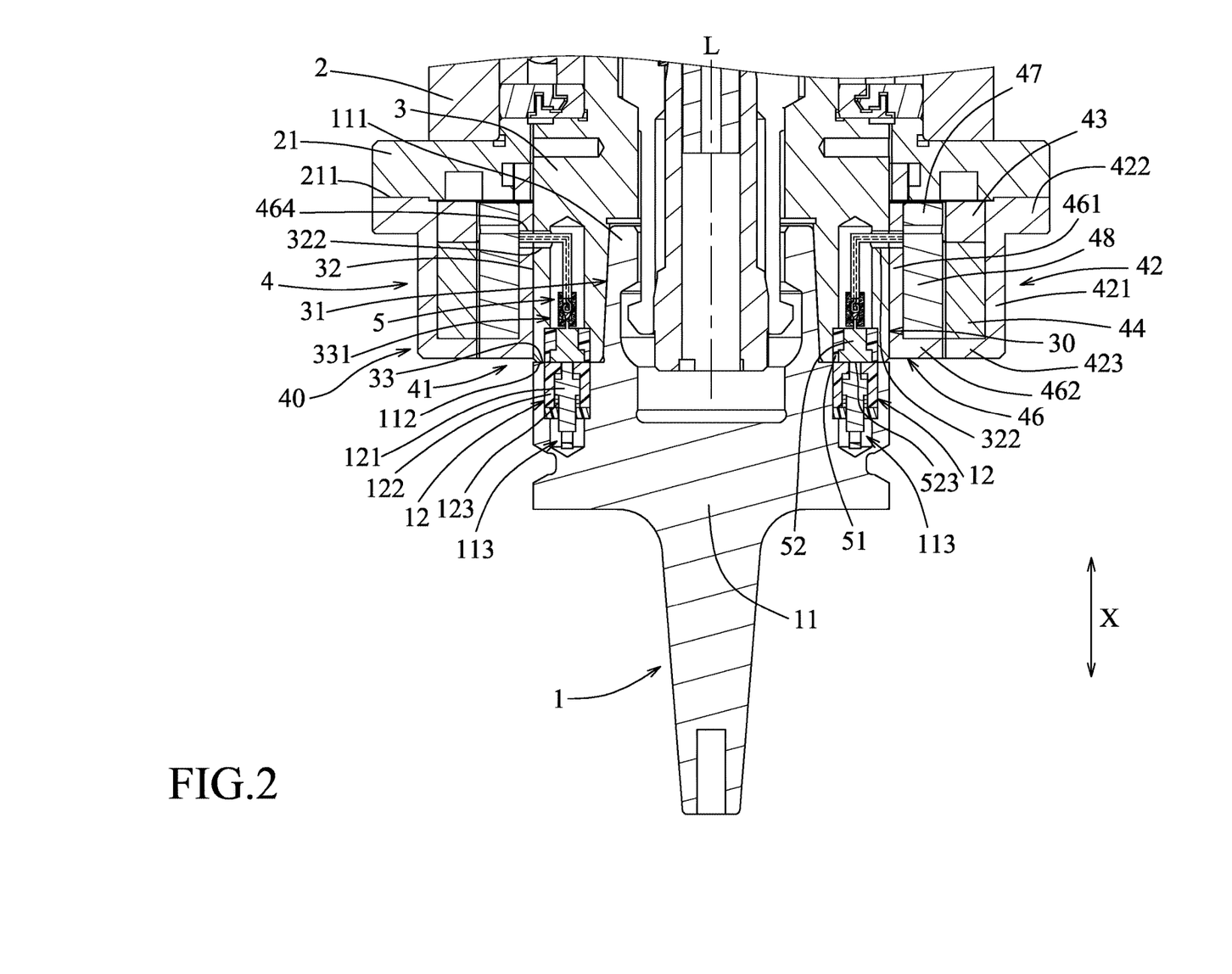
FIG. 2 is a fragmentary sectional view of the embodiment and the tool holder.

Referring to FIGS. 1 and 2, an embodiment of a spindle device 200 is mountable with a tool holder 1. In this embodiment, the tool holder 1 is an ultrasonic tool holder, and includes a holder body 11 for mounting a working tool (not shown), two electrically conductive modules 12 and a vibration generator (not shown). The holder body 11 has a taper section 111 and an annular end surface 112 surrounding an end of the taper section 111. The taper section 111 is dimensioned with the HSK tool holder specifications, and has a taper ratio of 1:10. The annular end surface 112 has two mounting holes 113 recessed therefrom for receiving the electrically conductive modules 12, respectively. Each electrically conductive module 12 includes an electrically conductive post 121, a positioning ring 122 sleeved on the electrically conductive post 121 to position the post 121 in the mounting hole 113, and a biasing spring 123 disposed to bias the post 121 to project the same from the annular end surface 112. The vibration generator is disposed within the holder body 11 and is electrically connected with the electrically conductive posts 12 of the electrically conductive modules 12 through two wires (not shown). The vibration generator is driven to transmit oscillation to the working tool on the tool holder 1.

Figure 3:
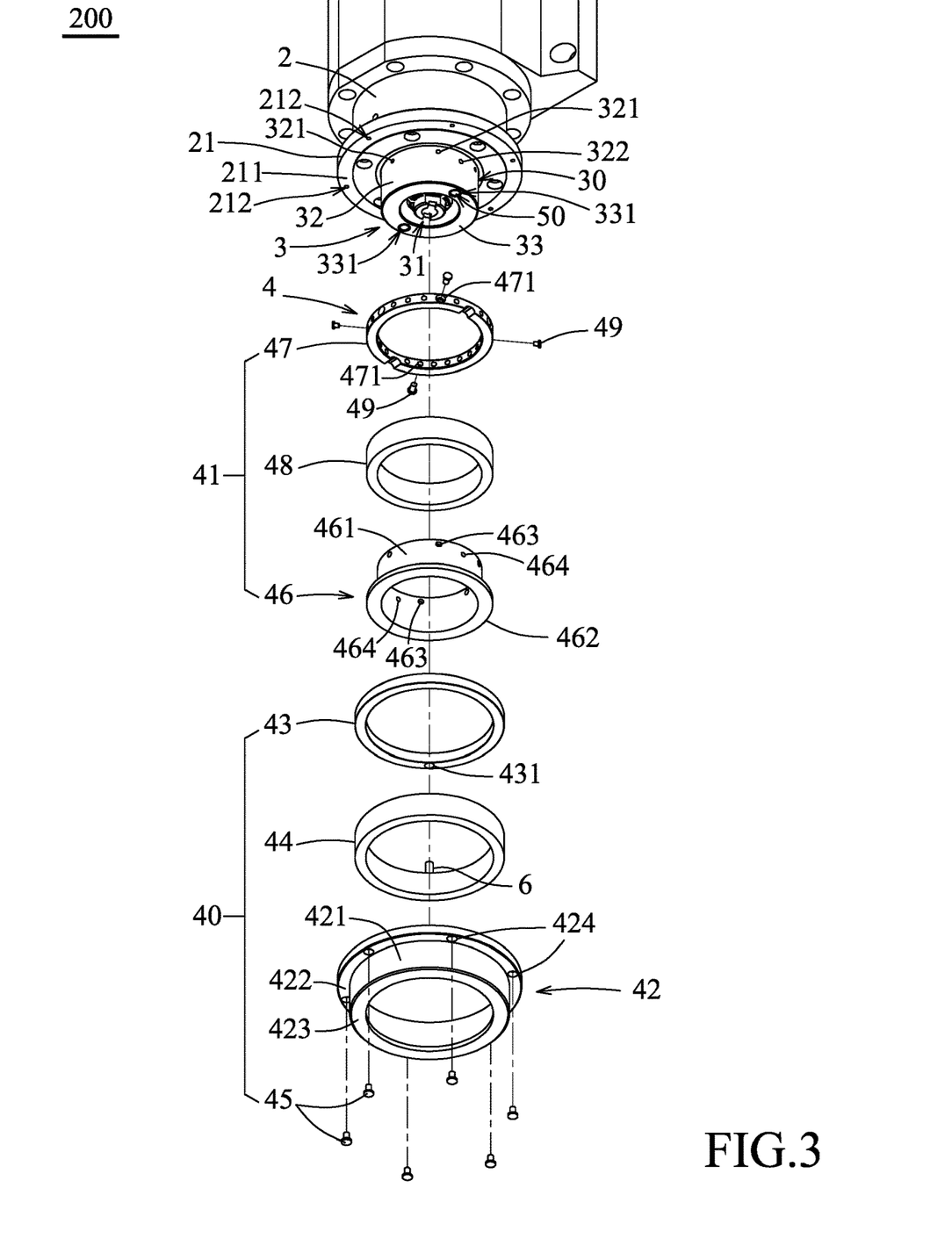
FIG. 3 is a fragmentary, exploded perspective view of the embodiment.

Referring to FIGS. 2 and 3, the spindle device 200 includes a spindle main body 2, a rotating spindle 3, a contactless power transmission module 4 and an electrically connecting module 5. The spindle main body 2 extends in an axial direction (X) to terminate at a surrounding flange 21 which extends radially and outwardly relative to an axial line (L). The surrounding flange 21 has a flange end surface 211. The flange end surface 211 has a plurality of screw holes 212 which are angularly displaced from each other about the axial line (L). The rotating spindle 3 is rotatably mounted to the spindle main body 2 about the axial line (L), and has a connecting portion 30 which projects axially and outwardly of the flange end surface 211 to be connectable with the tool holder 1. The rotating spindle 3 is driven by a driving mechanism (not shown) to be rotated relative to the spindle main body 2. The connecting portion 30 of the rotating spindle 3 has a taper hole 31 matingly engaged with the taper section 111 of the tool holder 1. The taper hole 31 is also dimensioned with the HSK tool holder specifications, and has a taper ratio of 1:10. The connecting portion 30 of the rotating spindle 3 has an outer peripheral wall 32 which surrounds the axial line (L) and which extends in the axial direction (X) to terminate at an axial end surface 33. The outer peripheral wall 32 has a plurality of screw holes 321 which are angularly displaced from each other about the axial line (L), and two wire passing holes 322 which are formed diametrically opposite to each other. The axial end surface 33 is annular and surrounds the taper hole 31 to abut against the annular end surface 112 of the tool holder 1. The axial end surface 33 is formed with two mounting holes 331 which are disposed diametrically opposite to each other and respectively in spatial communication with the wire passing holes 322.

Figure 4:
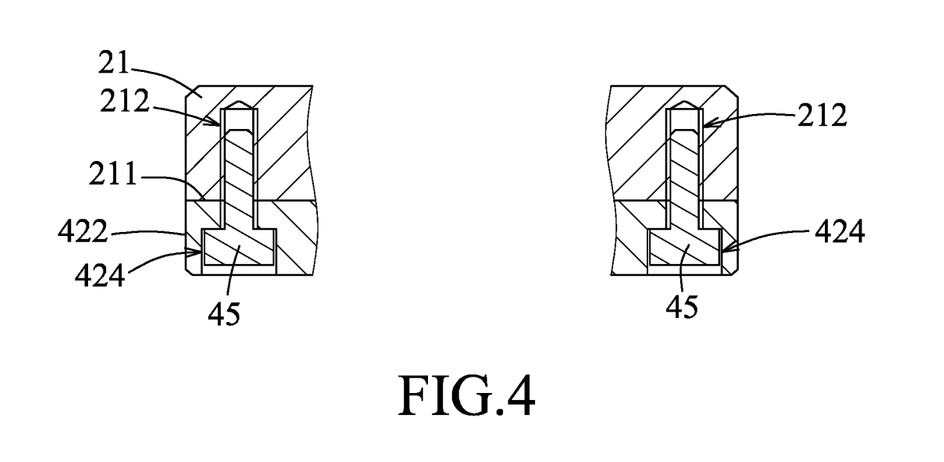
FIG. 4 is a fragmentary sectional view illustrating a first inducting unit affixed to a spindle main body by means of first screws of the embodiment.

Referring to FIGS. 2 to 4, the contactless power transmission module 4 is detachably mounted on the flange end surface 211 and the outer peripheral wall 32, and is electrically connected with an electrical cable 6 for receiving and transmitting power from the electrical cable 6. The power transmission module 4 includes a first inducting unit 40 and a second inducting unit 41. The first inducting unit 40 is detachably mounted on the flange end surface 211 of the spindle main body 2 and extends in the axial direction (X) from the flange end surface 211 for outputting the power. Specifically, the first inducting unit 40 includes a surrounding first carrier 42, a surrounding first inducting assembly 44, a first positioning ring 43 and a plurality of first screws 45. The surrounding first carrier 42 has a surrounding wall 421 surrounding the axial line (L) to be sleeved around the surrounding first inducting assembly 44, an annular connecting wall 422 extending radially and outwardly from an end of the surrounding wall 421 and abutting against the flange end surface 211, and an annular carrying wall 423 extending radially and inwardly from an opposite end of the surrounding wall 421. The annular connecting wall 422 has a plurality of step holes 424 respectively registered with the screw holes 212 such that each of the first screws 45 extends through the corresponding step hole 424 and threadedly engaged with the corresponding screw hole 212 to affix the annular connecting wall 422 on the flange end surface 211. The annular carrying wall 423 is formed for carrying an end of the surrounding first inducting assembly 44. The first positioning ring 43 is disposed inwardly of the surrounding wall 421 and opposite to the annular carrying wall 423 in the axial direction (X) to cooperate with the surrounding wall 421 and the annular carrying wall 423 to define a first surrounding receiving space for retainingly receiving the surrounding first inducting assembly 44. The first positioning ring 43 has a cable passing hole 431 for passing of the electrical cable 6. The electrical cable 6 is electrically connected to a power supply (not shown) and the surrounding first inducting assembly 44 so as to transmit a power generated from the power supply to the surrounding first inducting assembly 44.

With the surrounding first carrier 42 holding the surrounding first inducting assembly 44 and cooperating with the first positioning ring 43 to retain the surrounding first inducting assembly 44 in the first surrounding receiving space therebetween, an assembling operation thereof can be readily conducted. Moreover, the surrounding first inducting assembly 44 is concealed and protected by the surrounding first carrier 42 and the first positioning ring 43 from flying scraps during the working process of the machine tool. Furthermore, the surrounding first carrier 42 and the first positioning ring 43 may be made from a carbon steel material with high strength, hardness and wear resistance, to protect the surrounding first inducting assembly 44. Further, the surrounding first inducting assembly 44 is bonded to the surrounding first carrier 42 and the first positioning ring 43 by adhesives in this embodiment. Therefore, the surrounding first inducting assembly 44 is firmly affixed to the surrounding first carrier 42 and the first positioning ring 43 to prevent rotation relative thereto.

Figure 5:
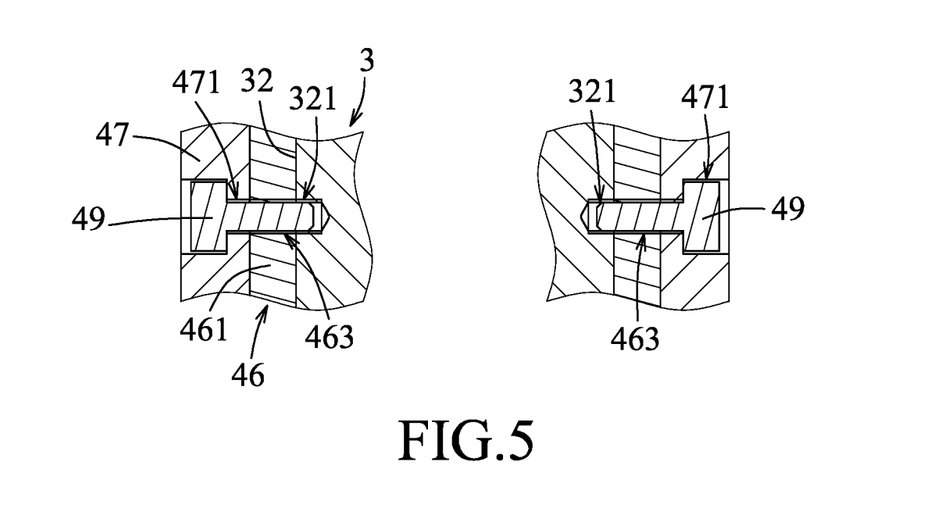
FIG. 5 is a fragmentary sectional view illustrating a second inducting unit affixed to a rotating spindle by means of second screws of the embodiment.

Referring to FIGS. 2, 3 and 5, the second inducting unit 41 is detachably mounted on the outer peripheral wall 32 of the connecting portion 30 of the rotating spindle 3 to be rotated with the rotating spindle 3. The second inducting unit 41 is spaced apart from and faces the first inducting unit 40 in radial directions so as to be rotated relative to the first inducting unit 40 to receive the power from the first inducting unit 40. Specifically, the second inducting unit 41 includes a surrounding second carrier 46, a surrounding second inducting assembly 48, a second positioning ring 47 and a plurality of second screws 49. The surrounding second carrier 46 is disposed radially and inwardly of the surrounding first carrier 42, and has a surrounding wall 461 surrounding the axial line (L) to be sleeved on the outer peripheral wall 32 of the rotating spindle 3, and an annular carrying wall 462 extending radially and outwardly from an end of the surrounding wall 461 and disposed adjacent to the annular carrying wall 423. The surrounding wall 461 has a plurality of through holes 463 angularly displaced from each other and respectively registered with the screw holes 321 in the outer peripheral wall 32, and two wire passing holes 464 respectively registered with the wire passing holes 322 in the outer peripheral wall 32. The second positioning ring 47 is sleeved on the surrounding wall 461 and is disposed opposite to the annular carrying wall 462 in the axial direction (X) to cooperate with the surrounding wall 461 and the annular carrying wall 462 to define a second surrounding receiving space for retainingly receiving the surrounding second inducting assembly 48. Specifically, the surrounding second inducting assembly 48 is sleeved on the surrounding wall 461 to abut against the annular carrying wall 462 so as to be carried by the surrounding second carrier 46. The second positioning ring 47 is disposed at an opposite end of the surrounding wall 461 to define the second surrounding receiving space that is spatial communication with the first surrounding receiving space. The second positioning ring 47 has a plurality of step holes 471 respectively registered with the through holes 463 in the surrounding wall 461 such that each of the second screws 49 extends through the corresponding step hole 471 and the corresponding through hole 463 and is threadedly engaged with the corresponding screw hole 321 to affix the second positioning ring 47 and the surrounding wall 461 of the surrounding second carrier 46 on the outer peripheral wall 32 of the rotating spindle 3. Thus, the surrounding second inducting assembly 48 is radially spaced apart from the surrounding first inducting assembly 44 to receive the power from the surrounding first inducting assembly 44.

With the surrounding second carrier 46 holding the surrounding second inducting assembly 48 and cooperating with the second positioning ring 47 to retain the surrounding second inducting assembly 48 in the second surrounding receiving space therebetween, an assembling operation thereof can be readily conducted. Moreover, the surrounding second inducting assembly 48 is concealed and protected by the surrounding second carrier 46 and the second positioning ring 47 from flying scraps during the working process of the machine tool. Furthermore, the surrounding second carrier 46 and the second positioning ring 47 may be made from a carbon steel material with high strength, hardness and wear resistance, to protect the surrounding second inducting assembly 48. Further, the surrounding second inducting assembly 48 is bonded to the surrounding second carrier 46 and the second positioning ring 47 by adhesives in this embodiment. Therefore, the surrounding second inducting assembly 48 is firmly affixed to the surrounding second carrier 46 and the second positioning ring 47 to prevent rotation relative thereto.

Figure 6:
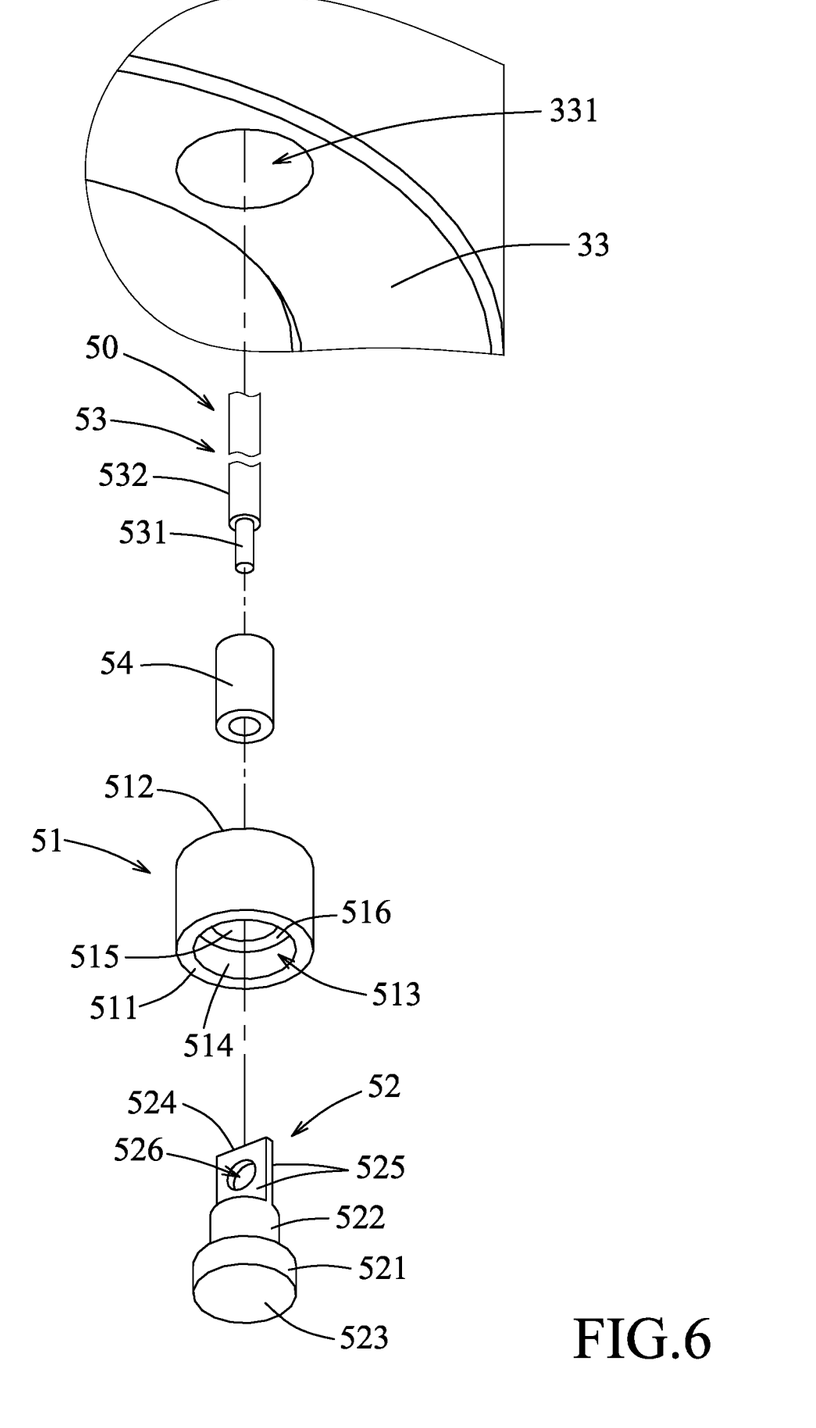
FIG. 6 is a fragmentary, exploded perspective view illustrating a conductive unit disposed in the rotating spindle.
Figure 7:
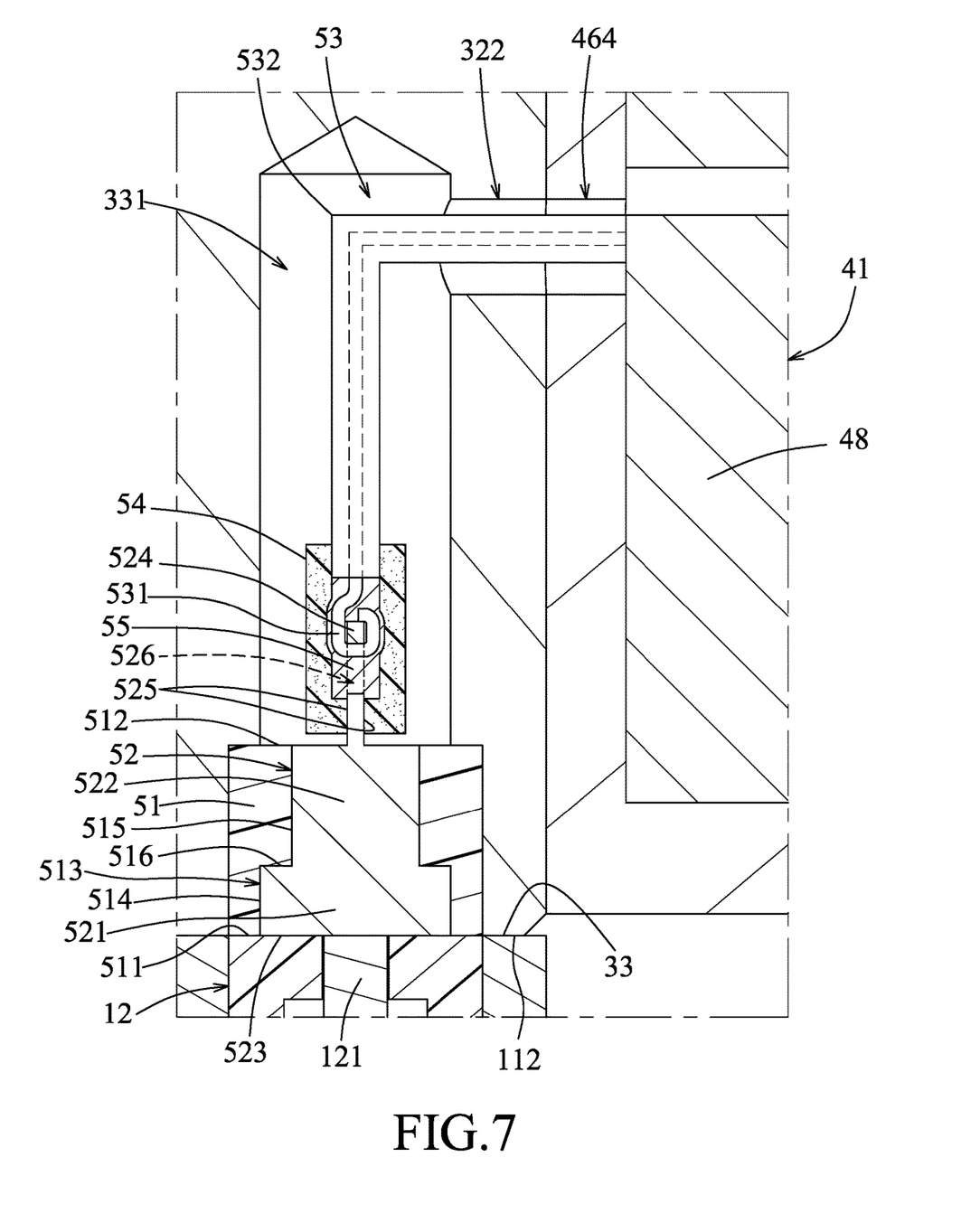
FIG. 7 is an enlarged sectional view of a portion of FIG. 2.

Referring to FIGS. 2, 6 and 7, the electrically connecting module 5 includes two conductive units 50 which are disposed in the connecting portion 30 of the rotating spindle 3. Each of the conductive units 50 includes an insulating support socket 51, an electrically conductive post 52, a lead wire 53 and a heat shrinkable protective sleeve 54. The insulating support socket 51 is made from an insulating material, such as a plastic material, and is disposed in the corresponding mounting hole 331 in the axial end surface 33 and adhered and affixed to the rotating spindle 3. The insulating support socket 51 has a through bore 513 extending in the axial direction (X) to terminate at an outwardly facing surface 511 and an inwardly facing surface 512. The through bore 513 has a larger-diameter segment 514 adjoined to the outwardly facing surface 511, and a smaller-diameter segment 515 adjoined to the inwardly facing surface 512 and communicated with the larger-diameter segment 514 such that the insulating support socket 51 has a shoulder surface 516 interposed between the larger-diameter segment 514 and the smaller-diameter segment 515.

The electrically conductive post 52 is made from a conductive metal material, such as copper, and is inserted in the through bore 513 of the insulating support socket 51. Specifically, the electrically conductive post 52 extends in the axial direction (X), and has a larger-diameter portion 521 which is matingly inserted in the larger-diameter segment 514 and abuts against the shoulder surface 516, and a smaller-diameter portion 522 which is matingly inserted in the smaller-diameter segment 515. The larger-diameter portion 521 has an electrically contact surface 523 which is exposed from the axial end surface 33 to serve as a terminal contact portion in contact with the electrically conductive post 121 of the corresponding electrically conductive module 12 for conducting the power to the corresponding electrically conductive module 12 of the tool holder 1. The electrically conductive post 52 further has a protruding connected portion 524 which extends from the smaller-diameter portion 522 in the axial direction (X) to project outwardly from the inwardly facing surface 512. The protruding connected portion 524 is formed as a flat plate having two flat surfaces 525 opposite to each other, and a transverse hole 526 extending from one flat surface 525 to the other flat surface 525.

With the electrically conductive post 52 having the electrically contact surface 523 of the larger-diameter portion 521 in contact with the corresponding electrically conductive post 121, a relatively large contact surface area of the electrically conductive post 52 can serve to contact the corresponding electrically conductive post 121 so as to stabilize the electrical connection therebetween.

The lead wire 53 has one end electrically connected with the surrounding second inducting assembly 48 of the second inducting unit 41, extends through the wire passing holes 464, 322 of the surrounding second carrier 46 and the outer peripheral wall 32, and has another end passing through the transverse hole 526 and wrapped and soldered to the protruding connected portion 524 by means of solder 55, so as to be electrically connected between the electrically conductive post 52 and the surrounding second inducting assembly 48. The lead wire 53 has a core wire 531 and an insulating jacket 532. In this embodiment, the solder 55 is filled in the transverse hole 526 and coated to the core wire 531, the flat surfaces 525 and the protruding connected portion 524.

During the assembling operation of the conductive unit 50, the core wire 531 is brought to extend through the transverse hole 526 and is then wrapped on the protruding connected portion 524 to be positioned on the protruding connected portion 524, which facilitates the soldering process thereof. With the protruding connected portion 524 formed as a flat plate, only a short portion of the core wire 531 is required to be inserted into the transverse hole 526 so as to be readily wrapped on the protruding connected portion 524 and firmly soldered thereto for ensuring the stability of electrical connection between the core wire 531 and the protruding connected portion 524.

Moreover, with the transverse hole 526, a coating area of the solder 55 is increased, and with the flat surfaces 525, a contact area of the core wire 531 with the protruding connected portion 524 is increased, which provides an improved electric conductivity to the electrically conductive post 52.

The heat shrinkable protective sleeve 54 is disposed between the protruding connected portion 524 and the lead wire 53 to cover part of the insulating jacket 532, soldered part of the protruding connected portion 524 and the core wire 531, and exposed part of the core wire 531 for protection and insulation.

Referring to FIG. 2, when it is desired to mount the tool holder 1 on the spindle device 200, the annular end surface 112 of the tool holder 1 is brought to abut against the axial end surface 33 of the rotating spindle 3, and each electrically conductive post 121 is brought in contact with the electrically contact surface 523 of the corresponding electrically conductive post 52 to receive the power output from the electrically conductive post 52. The power can be transmitted to the vibration generator from the electrically conductive posts 121 of the tool holder 1 through wires so as to generate oscillation for performing a working operation to a workpiece.

With the first inducting unit 40 disposed on the flange end surface 211 of the spindle main body 2 and the second inducting unit 41 disposed on the outer peripheral wall 32 of the rotating spindle 3 and surrounded by the first inducting unit 40, the contactless power transmission module 4 does not project laterally of the surrounding flange 21 of the spindle main body 2 so as to prevent contact and impact with a workpiece and a worktable of a machine base during the rotation of the spindle in a cutting working process.

Referring to FIGS. 2, 4 and 5, when it is desired to replace the contactless power transmission module 4, the first screws 45 are removed to detach the first inducting unit 40 from the flange end surface 211, and the second screws 49 are removed to detach the second inducting unit 41 from the outer peripheral wall 32. The assembly and disassembly of the contactless power transmission module 4 are convenient to conduct.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:
1. A spindle device mountable with a tool holder which has two electrically conductive modules, comprising:

a spindle main body extending in an axial direction to terminate at a surrounding flange which extends radially and outwardly relative to an axial line, said surrounding flange having a flange end surface;

a rotating spindle rotatably mounted to said spindle main body about the axial line and having a connecting portion which projects outwardly of said flange end surface to be connectable with the tool holder, said connecting portion having an outer peripheral wall which surrounds the axial line and which extends in the axial direction to terminate at an axial end surface;

a contactless power transmission module disposed on said flange end surface and said outer peripheral wall for supplying power; and an electrically connecting module including two conductive units which are disposed in said connecting portion of said rotating spindle and which are electrically connected with said contactless power transmission module, each of said conductive units including an insulating support socket and an electrically conductive post which is inserted in said insulating support socket and which extends in the axial direction to have a terminal contact portion that is exposed from said axial end surface for conducting the power to a corresponding one of the electrically conductive modules of the tool holder.

2. The spindle device as claimed in claim 1, wherein said insulating support socket has a through bore extending in the axial direction, said through bore having a larger-diameter segment and a smaller-diameter segment which is communicated with said larger-diameter segment, said insulating support socket having a shoulder surface interposed between said larger-diameter segment and said smaller-diameter segment, said electrically conductive post having a larger-diameter portion which is matingly inserted in said larger-diameter segment and abuts against said shoulder surface, and a smaller-diameter portion which is matingly inserted in said smaller-diameter segment, said larger-diameter portion having an electrically contact surface which is disposed to be in contact with a respective one of the electrically conductive modules of the tool holder.

3. The spindle device as claimed in claim 2, wherein said through bore of said insulating support socket extends in the axial direction to terminate at an outwardly facing surface and an inwardly facing surface adjoined to said larger-diameter segment and said smaller-diameter segment, respectively, said electrically conductive post further having a protruding connected portion which extends from said smaller-diameter portion in the axial direction to project outwardly from said inwardly facing surface, said protruding connected portion having a transverse hole formed therethrough, each of said conductive units further including a lead wire, said lead wire having one end electrically connected with said contactless power transmission module, and another end passing through said transverse hole and wrapped and soldered to said protruding connected portion.

4. The spindle device as claimed in claim 3, wherein said protruding connected portion is formed as a flat plate having two flat surfaces opposite to each other, said transverse hole extending from one of said flat surfaces to the other one of said flat surfaces, said another end of said lead wire being in contact with and soldered on said flat surfaces.

5. The spindle device as claimed in claim 3, wherein each of said conductive units further includes a protective sleeve which is disposed to cover connection of said lead wire and said protruding connected portion.

6. The spindle device as claimed in claim 1, wherein said contactless power transmission module includes a first inducting unit which is detachably mounted on said flange end surface of said spindle main body and which extends in the axial direction from said flange end surface for outputting the power, and a second inducting unit which is detachably mounted on said outer peripheral wall of said connecting portion of said rotating spindle and which is rotatable with said rotating spindle, said second inducting unit being spaced apart from and facing said first inducting unit in radial directions so as to be rotated relative to said first inducting unit to receive the power from said first inducting unit.

7. The spindle device as claimed in claim 6, wherein said first inducting unit includes a surrounding first carrier which is affixed to said flange end surface and which surrounds the axial line to define a first surrounding receiving space therein, a surrounding first inducting assembly which is carried by said surrounding first carrier, and a first positioning ring which cooperates with said surrounding first carrier to retain said surrounding first inducting assembly in said first surrounding receiving space, said second inducting unit including a surrounding second carrier which is sleeved on and affixed to said outer peripheral wall, which is disposed radially and inwardly of said surrounding first carrier, and which surrounds the axial line to define a second surrounding receiving space that is in spatial communication with said first surrounding receiving space, a surrounding second inducting assembly which is carried by said surrounding second carrier, and a second positioning ring which cooperates with said surrounding second carrier to retain said surrounding second inducting assembly in said second surrounding receiving space so as to have said surrounding second inducting assembly radially spaced apart from said surrounding first inducting assembly.

8. The spindle device as claimed in claim 7, wherein said surrounding first carrier has a surrounding wall surrounding said surrounding first inducting assembly, an annular connecting wall extending radially and outwardly from an end of said surrounding wall and affixed on said flange end surface, and an annular carrying wall extending radially and inwardly from an opposite end of said surrounding wall, said first positioning ring being disposed inwardly of said surrounding wall and opposite to said annular carrying wall to cooperate with said surrounding wall and said annular carrying wall to define said first surrounding receiving space for retainingly receiving said surrounding first inducting assembly.

9. The spindle device as claimed in claim 7, wherein said surrounding second carrier has a surrounding wall affixed to said outer peripheral wall, and an annular carrying wall extending radially and outwardly from an end of said surrounding wall, said second positioning ring being sleeved on said surrounding wall and disposed opposite to said annular carrying wall to cooperate with said surrounding wall and said annular carrying wall to define said second surrounding receiving space for retainingly receiving said surrounding second inducting assembly.

10. The spindle device as claimed in claim 7, wherein said surrounding second carrier has two wire passing holes, each of said conductive units further including a lead wire passing through a respective one of said wire passing holes and electrically connected between said electrically conductive post of a respective one of said conductive units and said surrounding second inducting assembly.

11. The spindle device as claimed in claim 7, wherein said surrounding first inducting assembly is bonded to said surrounding first carrier and said first positioning ring by adhesives, and said surrounding second inducting assembly is bonded to said surrounding second carrier and said second positioning ring by adhesives.

12. The spindle device as claimed in claim 1, wherein said connecting portion of said rotating spindle has a taper hole for securing the tool holder, said taper hole being dimensioned with the HSK tool holder specifications.

13. A spindle device comprising:
   a spindle main body extending in an axial direction to terminate at a surrounding flange which extends radially and outwardly relative to an axial line, said surrounding flange having a flange end surface;
   a rotating spindle rotatably mounted to said spindle main body about the axial line and having a connecting portion which projects outwardly of said flange end surface, said connecting portion having an outer peripheral wall which surrounds the axial line and which extends in the axial direction to terminate at an axial end surface, said connecting portion having a taper hole dimensioned with the HSK tool holder specifications;
   a contactless power transmission module detachably mounted on said flange end surface and said outer peripheral wall; and
   an electrically connecting module including two conductive units which are disposed in said connecting portion of said rotating spindle and which are electrically connected with said contactless power transmission module, each of said conductive units having a terminal contact portion which is exposed from said axial end surface.

14. The spindle device as claimed in claim 13, wherein said contactless power transmission module includes a first inducting unit which is affixed to said flange end surface of said spindle main body and which extends in the axial direction from said flange end surface, and a second inducting unit which is affixed to said outer peripheral wall of said connecting portion of said rotating spindle and which is rotatable with said rotating spindle, said second inducting unit being spaced apart from and facing said first inducting unit in radial directions.

\* \* \* \* \*